(12) United States Patent
Nagatomo

(10) Patent No.: US 8,214,209 B2
(45) Date of Patent: Jul. 3, 2012

(54) SPEECH RECOGNITION SYSTEM, METHOD, AND COMPUTER READABLE MEDIUM THAT DISPLAY RECOGNITION RESULT FORMATTED IN ACCORDANCE WITH PRIORITY

(75) Inventor: Kentarou Nagatomo, Tokyo (JP)

(73) Assignee: NEC Corporation, Tokyo (JP)

( * ) Notice: Subject to any disclaimer, the term of this patent is extended or adjusted under 35 U.S.C. 154(b) by 1028 days.

(21) Appl. No.: 12/083,498

(22) PCT Filed: Oct. 11, 2006

(86) PCT No.: PCT/JP2006/320288
§ 371 (c)(1),
(2), (4) Date: Jun. 10, 2008

(87) PCT Pub. No.: WO2007/043566
PCT Pub. Date: Apr. 19, 2007

(65) Prior Publication Data
US 2009/0234648 A1 Sep. 17, 2009

(30) Foreign Application Priority Data
Oct. 13, 2005 (JP) ................................. 2005-299007

(51) Int. Cl.
*G10L 15/26* (2006.01)
*G10L 11/00* (2006.01)
*G10L 21/06* (2006.01)
*G06F 17/21* (2006.01)
(52) U.S. Cl. ........ 704/235; 704/270; 704/276; 715/254; 715/271; 715/727
(58) Field of Classification Search ........................ None
See application file for complete search history.

(56) References Cited

U.S. PATENT DOCUMENTS

| | | | |
|---|---|---|---|
| 5,835,922 A | | 11/1998 | Shima et al. |
| 6,006,183 A | * | 12/1999 | Lai et al. ........................ 704/235 |
| 6,785,650 B2 | * | 8/2004 | Basson et al. ................. 704/235 |
| 6,835,922 B1 | | 12/2004 | Shima et al. |
| 6,973,428 B2 | * | 12/2005 | Boguraev et al. ............. 704/251 |

(Continued)

FOREIGN PATENT DOCUMENTS

JP 07-098708 4/1995

(Continued)

OTHER PUBLICATIONS

T. Kemp et al., "Estimating Confidence Using Word Lattices," Proc. $5^{th}$ Eur. Conf. Speech, Communication, Technology 19977, Sep. 1997, pp. 827-830.

(Continued)

*Primary Examiner* — Brian Albertalli
(74) *Attorney, Agent, or Firm* — Foley & Lardner LLP

(57) ABSTRACT

Disclosed is a speech recognition system which including speech input means for receiving the speech data, speech recognition means for receiving the input speech data from the speech input means and performing speech recognition, recognition result evaluation means for determining a priority of at least one of a recognition result and each portion forming the recognition result obtained by the speech recognition by the speech recognition means, storage means for storing the recognition result and the priority, recognition result formatting means for determining display/non-display of the recognition result and/or each portion forming the recognition result and generating output information according to the priority, and output means for outputting the output information.

12 Claims, 6 Drawing Sheets

U.S. PATENT DOCUMENTS

| | | | |
|---|---|---|---|
| 6,993,482 B2 * | 1/2006 | Ahlenius | 704/235 |
| 7,236,932 B1 * | 6/2007 | Grajski | 704/277 |
| 7,380,203 B2 * | 5/2008 | Keely et al. | 715/230 |
| 7,450,698 B2 * | 11/2008 | Bushey et al. | 379/88.14 |
| 2003/0189603 A1 * | 10/2003 | Goyal et al. | 345/863 |
| 2010/0094628 A1 * | 4/2010 | Bacchiani et al. | 704/235 |

FOREIGN PATENT DOCUMENTS

| | | |
|---|---|---|
| JP | 08-212228 | 8/1996 |
| JP | 08-255255 | 10/1996 |
| JP | 10-028170 | 1/1998 |
| JP | 11-025091 | 1/1999 |
| JP | 11-150603 | 6/1999 |
| JP | 11-231891 | 8/1999 |
| JP | 11-338494 | 12/1999 |
| JP | 2002-049389 A | 2/2002 |
| JP | 2003-167600 A | 6/2002 |
| JP | 2002-297188 A | 10/2002 |
| JP | 2003-050596 A | 2/2003 |
| JP | 2003-167600 A | 6/2003 |
| JP | 2003-218999 A | 7/2003 |
| JP | 3534712 | 3/2004 |
| JP | 2004-326555 A | 11/2004 |
| JP | 2004-343392 A | 12/2004 |
| JP | 2005-128130 A | 5/2005 |
| JP | 3827704 | 7/2006 |

OTHER PUBLICATIONS

B. Rueber, "Obtaining Confidence Measures From Sentence Probabilities," Proc. $5^{th}$ Eur. Conf. Speech Communication Technology, Sep. 1997, pp. 739-742.

T. Schaaf et al., "Confidence Measures for Spontaneous Speech Recognition," Proc. ICASSP 1997, vol. 2, Apr. 1997, 4 pages.

F. Wessel et al., "Confidence Measures for Large Vocabulary Continuous Speech Recognition," IEEE Transactions on Speech and Audio Processing, vol. 9:3, Mar. 2001, pp. 288-298.

* cited by examiner

SPEECH RECOGNITION SYSTEM, METHOD, AND COMPUTER READABLE MEDIUM THAT DISPLAY RECOGNITION RESULT FORMATTED IN ACCORDANCE WITH PRIORITY

This application is the National Phase of PCT/JP2006/320288, filed Oct. 11, 2006, which claims priority to Japanese Application No. 2005-299007, filed Oct. 13, 2005, the disclosures of which are hereby incorporated by reference in their entirety.

TECHNICAL FIELD

The present invention relates to a speech recognition technique. More specifically, the invention relates to a speech recognition system, a speech recognition method, and a computer program that performs recognition result output with high glanceability, based on a speech recognition result.

BACKGROUND ART

Generally, conventional typical speech recognition systems regard the speech recognition result of a certain speech and the speech recognition result of other speech as being completely unrelated ones. It seldom happens that some dependence is introduced into displays of recognition results of a plurality of speeches. As a result, the individual recognition results are just arranged. A system described in each of Patent Documents 1 and 2, for example, has a function of displaying a list of recognition results of a plurality of speeches. However, a recognition result of each speech is self contained by itself.

On the other hand, speech recognition is not always performed perfectly. An approach to displaying a more reliable recognition result by priority, based on a certain evaluation measure has been hitherto employed.

As the evaluation measure, linguistic likelihood
acoustic likelihood, or
confidence (refer to Non-patent Document 1) of a recognition result is employed. In Patent Document 3, for example, when a normalized likelihood (referred to as the "confidence") of a recognition result as the evaluation measure exceeds a certain threshold value given in advance, the recognition result is output. Otherwise, the recognition result is discarded.

Patent Document 4, as a publication about display of a recognition result, for example, discloses a system that displays a speech waveform and displays a character string (with a part of the character string of a recognition result being sometimes omitted, for display) representing at least a part of content of a speech portion, thereby allowing the content of the speech portion included in the waveform to be visually checked. In many cases, a tendency in the content of a speech or the like cannot be complemented by display of the head and the end of a speech (because an important matter (identified by a nominal) tends to be spoken between the head and the end of the speech, rather than at the head or end of the speech, though depending on the field of the speech). At the head of a spoken language, a nonsense word (such as "well", "Ah", "Yes", or the like) often appears. At the end of the spoken language in particular, utterance that is not precise (accurate) but vague is often made. As such utterance, rapid pronunciation (such as "It's so, isn't it?" instead of "It is so, isn't it?"), and word-final vowel-lengthening (such as "it iis" instead of "it is") may be pointed out. In such a case, the approach disclosed in Patent Document 4 may not display a significant character string.

Meanwhile, as processing for screen display, in Patent Document 5, there is disclosed an image/video processing and displaying method, in which, when an important portion of an image is known, the size of the image as a whole is simply reduced and then, superimposed display of the important portion of the image is performed with a larger display magnification rate than a display magnification rate of the image.

Patent Document 1:
JP Patent Kokai Publication No. JP-A-11-338494
Patent Document 2:
JP Patent Kokai Publication No. JP-A-11-150603
Patent Document 3:
JP Patent Kokai Publication No. JP-P2003-50595A
Patent Document 4:
JP Patent Kokai Publication No. JP-P2002-297188A
Patent Document 5:
JP Patent Kokai Publication No. JP-P2004-326555A
Non-patent Document 1:
T. Schaaf, T. Kemp: Confidence measures for spontaneous speech recognition, in Proc. ICASSP 1997, Vol. 2, pp. 875 ff, Munich, April 1997
Non-patent Document 2:
Frank Wessel, Ralf Schluter, Kalus Macherey, ans Herman Ney, "Confidence Measures for Large Vocabulary Continuous Speech Recognition," IEEE Trans. on Speech and Audio Processing. Vol 9, No. 3, March 2001
Non-patent Document 3:
B. Rueber, "Obtaining confidence measures from sentence probabilities," in Proc. 5th Eur. Conf. Speech Communication Technology 1997, Rhodes, Greece, September 1997, pp. 739-742.
Non-patent Document 4:
Tech. Rep. Interactive Systems Labs.," ILKD, April. 1996.
Non-patent Document 5:
T. Kemp and T. Schaaf, "Estimating confidence using word lattices," in Proc. 5th Eur. Conf. Speech, Communication, Technology 1997, Rhodes, Greece, September 1997, pp. 827-830.

DISCLOSURE OF THE INVENTION

Problems to be Solved by the Invention

There has not been proposed or developed a system in which while a so-called overall tendency of the content of a speech is being overlooked, local tendencies of contents of the speech can also be hierarchically presented, instead of displaying entire recognition results of speech recognition processing performed by receiving the waveform of the speech in time series in real time or off-line mode. The present invention has been completed in view of this situation. A description about this situation will be given below. The inventor of this application has recognized that conventional speech recognition systems have problems that will be listed below.

A first problem is that in the conventional speech recognition systems, an effective scheme for presenting to the user the overall or local tendency of an input speech obtained by commanding a bird's eye view of or overlooking a plurality of speech recognition results is missing.

In other words, it is desired to implement a display function mainly targeted for causing all of recognition results within a certain group of time periods to be overlooked, regarding individual speeches as discrete ones.

A second problem is that when continuous speech recognition is performed over a long time, and when speech recognition results are output without alteration, the speech recognition results will not be accommodated within a limited storage area or a screen (a frame buffer).

The second problem arises because the conventional speech recognition systems do not include a function of making choice between minimum required information and other information, from among the recognition results.

It is supposedly because in conventional speech recognition techniques, word-based speech recognition is mainly used, and even if recognition results are arranged without alteration, a screen space has been considered to be enough.

A third problem is as follows. Assume that threshold processing is performed on speech recognition results in order to sort out information to be displayed on the screen. In this case, when a certain range is to be overlooked, a sufficient amount of information may be displayed. However, when a finer range is to be overlooked, the amount of information may become too sparse.

It is because, since a threshold used in such threshold processing has been statically given, or is not correlated with a screen display UI (user interface), information sorting optimized for the range to be overlooked is not performed.

An object of the present invention is to provide a speech recognition system, a speech recognition method, and a program that allow speech recognition results of a plurality of speeches included in comparatively long input speech data to be overlooked.

Other object of the present invention is to provide a speech recognition system, a speech recognition method, and a program by which an input speech data range to be overlooked can be readily changed over.

Still other object of the present invention is to provide a speech recognition system, a speech recognition method, and a program capable of sorting out information to be displayed.

Still other object of the present invention is to provide the speech recognition system capable of sorting out information to be displayed.

Means to Solve the Problems

A speech recognition system according to one aspect (aspect) of the present invention includes:

speech input means that inputs speech data;

speech recognition means that receives the speech data input from the speech input means and performing speech recognition;

recognition result evaluation means that derives a confidence of a recognition result obtained by the speech recognition by the speech recognition means and determines a priority of the recognition result based on the confidence;

storage means that at least stores the recognition result and the priority;

recognition result formatting means that performs formatting of output information on the recognition result according to the priority; and output means that outputs the output information formatted by the recognition result formatting means.

In the present invention, the recognition result formatting means may change whether to output the recognition result or not, and/or an output form of the recognition result according to the priority.

In the present invention, the recognition result formatting means may adjust at least one of an abbreviation form, an output size, grayscale output, a balloon, animation (blinking), see-through output, superimposed output, and an output speed of the recognition result, as variable control over the output form of the recognition result according to the priority.

In the present invention, the recognition result evaluation means determines the priority of at least one of the recognition result and a portion of the recognition result, obtained by the speech recognition by the speech recognition means.

In the present invention, the recognition result evaluation means computes the priority based on a confidence of a word obtained by the speech recognition and an importance level defined for the word in advance.

A reproduction device according to other aspect of the present invention is the reproduction device including the speech recognition system described above. The speech input means reproduces a speech recorded on a recording medium that records the speech data and supplies the reproduced speech data to the speech recognition means. Then, the recognition result selected according to the priority of a predetermined level is output from among speeches recorded on the recording medium.

A device according to other aspect of the present invention is a speech transcription device that receives speech data, performs speech recognition, and transcribes a result of the speech recognition into a text. The device includes the speech recognition system described above according to the present invention. The speech input means may receive speech data recorded on a recording medium or speech data input through a microphone and may supply the received speech data to the speech recognition means. The output means may output output information on a recognition result onto a display screen and/or as a file. The speech recognition system of the present invention may be applied to a device by which minutes such as those for a conference or a congress are viewed.

A speech recognition system according to other aspect of the present invention includes:

speech input means that inputs speech data;

speech recognition means that receives the input speech data from the speech input means and performing speech recognition;

recognition result evaluation means that determines a priority of at least one of a recognition result and/or a portion that forms the recognition result, obtained by the speech recognition by the speech recognition means;

storage means that stores the recognition result and the priority;

recognition result formatting means that determines display/non-display of the recognition result and/or the portion of the recognition result and creates an output image, according to the priority; and screen displaying means that outputs the output image to a display device.

The present invention may further include:

display target range setting means that sets a range of the speech data to be output and ranges of the recognition result and the portion of the recognition result.

The recognition result formatting means may determine display/non-display of the recognition result and/or the portion of the recognition result and may create the output image according to priority and set range of said output.

In the present invention, the input speech data supplied to the speech recognition means may be stored in the storage means. Then, the speech recognition system may further include:

speech reproduction instructing means that refers to the output image and specifies reproduction of the input speech data; and speech reproduction means that reproduces the input speech data stored in the storage means, based on the specification by the speech reproduction instructing means.

In the present invention, the recognition result evaluation means may derive the priority, using at least one of an acoustic likelihood, a linguistic likelihood, and a confidence based on a posterior probability of each of the recognition result and each portion of the recognition result obtained by the speech recognition means.

In the present invention, the recognition result evaluation means may derive the priority of a word or a chain of words that may form the recognition result and/or the portion of the recognition result obtained by the speech recognition means, using an importance level defined in advance.

In the present invention, when the output image is created, the recognition result formatting means may display at least one of the recognition result and the portion of the recognition result with the priority thereof exceeding a predetermined threshold value.

In the present invention, when the output image is created, the recognition result formatting means may perform sequential display of the recognition result or the portion of the recognition result in descending order of the priority, and when there is not an enough display region of the display device, the recognition result formatting means may perform alternative display of a remainder of the recognition result and/or the portion of the recognition result, using a predetermined symbol.

In the present invention, when the output image is created, the recognition result formatting means may perform control so that an area of the display region occupied by the recognition result and/or the portion of the recognition result increases in ascending order of the priority, and a larger area of the display region is occupied by the recognition result and/or the portion of the recognition result with the priority of a relatively high level, and a smaller area of the display region is occupied by the recognition result and/or the portion of the recognition result with the priority of a relatively low level.

A method according to other aspect of the present invention is the method of performing speech recognition by a speech recognition device. The method includes:

a step of inputting speech data;

a step of receiving the input speech data and performing speech recognition on the input speech data;

a step of deriving a confidence of at least one of a recognition result and a portion of the recognition result obtained by the speech recognition and determining a priority of the at least one of the recognition result and the portion of the recognition result based on the confidence;

a step of performing formatting of output information on the recognition result and/or the portion of the recognition result according to the priority; and a step of outputting the formatted output information.

In the method according to the present invention, whether the recognition result is output or not and/or an output form of the recognition result may be changed according to the priority. In the method according to the present invention, at least one of an abbreviation form of the recognition result, an output size, gray (grayscale) output, a balloon, animation (blinking), see-through output (transmittance control), superimposed output, and an output speed of the recognition result may be adjusted, as variable control over the output form of the recognition result according to the priority. In the method according to the present invention, a confidence of a word obtained by the speech recognition may be derived, and the priority may be computed based on the confidence and an importance level of the word.

The method according to the present invention further includes:

a step of determining display/non-display of the recognition result and/or the portion of the recognition result and creating an output image according to the priority; and a step of outputting the created output image onto a display screen.

The method according to the invention may further include:

a step of setting a range of the speech data to be output and a range of the at least one of the recognition result and the portion of the recognition result. In the step of creating the output image, the display/non-display of the recognition result and/or the portion of the recognition result may be determined and the output image may be created according to priority and set range of said output.

The method according to the present invention may further include:

a step of referring to the output image and reproducing the input speech data; and a step of reproducing the speech data based on the specification.

A computer program according to the present invention is the program that causes a computer which performs speech recognition processing to execute:

a processing of inputting speech data;

a processing of performing speech recognition on the input speech data;

a processing of deriving a confidence of at least one of a recognition result and a portion of the recognition result obtained by the processing of the speech recognition and determining a priority of the at least one of the recognition result and the portion of the recognition result based on the confidence;

a processing of performing formatting of output information on the recognition result and/or the portion of the recognition result according to the priority; and a processing of outputting the formatted output information to an output device.

In the computer program according to the present invention, at least one of an abbreviation form of the recognition result, an output size, gray (grayscale) output, a balloon, animation (blinking), see-through output (transmittance control), superimposed output, and an output speed of the recognition result may be adjusted, as variable control over an output form of the recognition result according to the priority. In the computer program according to the present invention, a confidence of a word obtained by the speech recognition may be derived, and the priority may be computed based on the confidence and an importance level of the word.

The computer program according to the present invention is the program which causes the computer to execute:

a processing of setting a range of the speech data to be output and a range of the at least one of the recognition result and the portion of the recognition result; and a processing of determining display/non-display of the recognition result and/or the portion of the recognition result and creating an output image according to priority and set range of said output.

A server device according to the present invention is the server device including the speech recognition system described above.

A system according to the present invention includes:

means that derives confidences of speech recognition results of speech data input in a time series, computes priorities of the speech recognition results based on the confidences, and stores the recognition results and the priorities in storage means, with the recognition results associated with the priorities; and control means that performs control over output of the recognition results based on the priorities of the recognition results. The control means performs the control so that, from among the recognition results of a plurality of speeches included in the input speech data being comparatively long, a portion with the priority of a relatively high level is selectively output, or the portion with the priority of the relatively high level is output in an output form different from an output form of a portion with the priority level of a relatively low level, to allow the recognition results of the speeches to be overlooked.

Meritorious Effects of the Invention

The present invention allows speech recognition results of a plurality of speeches included in comparatively long input speech data to be overlooked. When the present invention is used for reproduction of a recorded speech, for example, an overview of recorded content can be overlooked. Accordingly, the present invention is effective.

The reason why the present invention is effective is that displayed content is adjusted so that the displayed content may be overlooked, based on the output screen and a range of speech data to be displayed.

According to the present invention, when switching the range of speech data to be displayed, an amount of information suited to the display target range is always output. The reason for such output is that a sorting-out operation is switched according to the size of the output screen.

According to the present invention, by making choice among recognition results in some way, a more important recognition result can be quickly found out.

EXPLANATIONS OF SYMBOLS

Figure 1:
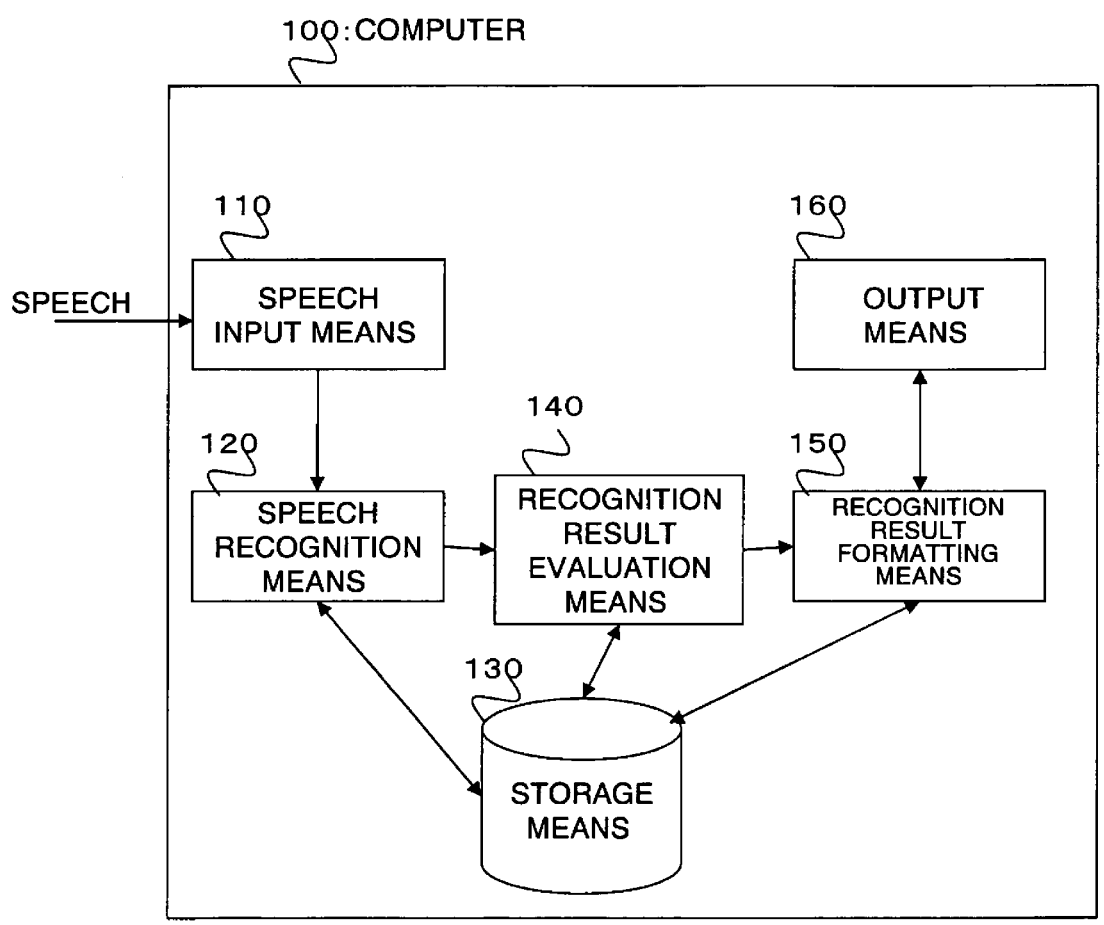
FIG. 1 is a block diagram showing a configuration of a first embodiment of the present invention.

100 computer
110 speech input means
120 speech recognition means
130 storage means
140 recognition result evaluation means
150 recognition result formatting means
151 recognition result capturing means
152 aligned index storage means
153 formatting processing computation means
154 internal output buffer means
160 output means
160A screen displaying means
170 display target range setting means

180 waveform reproduction instructing means
190 waveform reproduction means
200 window
210 recognition result display list box
211 speech index pane
212 recognition result pane
213 scroll bar
220 enlarged display button

PREFERRED MODES FOR CARRYING OUT THE INVENTION

The present invention described above will be described with reference to appended drawings so as to describe the invention in further detail. First, an overview of the present invention will be described. The present invention includes speech input means (110 in FIG. 1), output means (160 in FIG. 1), speech recognition means (120 in FIG. 1), recognition result evaluation means (140 in FIG. 1), and recognition result formatting means (150 in FIG. 1). The speech recognition means (120) performs speech recognition processing on an input speech received from the speech input means (110). Then, a result of the speech recognition processing is subjected to formatting (transform) into appropriate output information by the recognition result formatting means (150), and then displayed to a user by the output means (160).

The recognition result formatting means (150) performs formatting of an output of the speech recognition result so that all or a specified portion of speech data to be displayed may be overlooked. Information with a low priority is deleted or made difficult to read. On the contrary, information with a high priority is retained and displayed, easy to read.

In other exemplary embodiment of the present invention, by including display target range setting means (170 in FIG. 2), switching of a speech data range to be displayed can be made.

In this case, the recognition result formatting means (150 in FIG. 2) changes a processing operation of sorting out information to be displayed by referring to a specified display target range and the size of screen displaying means.

By adopting such a configuration, recognition results of a plurality of speeches can be overlooked on a screen, and a particularly important portion can be readily read. Further, by quickly switching the screen to perform detailed display of the particularly important portion, the above-mentioned goals can be achieved. With this arrangement, an overall tendency that cannot be seen by arrangement of individual recognition results can be observed. With this arrangement, an operation of overlooking an entirety, detecting a characteristic specific portion, and then displaying details of the characteristic specific portion can be readily performed. A description will be given below in connection with embodiments.

EXAMPLES

Referring to FIG. 1, a computer 100 that operates by program control in a first example of the present invention includes speech input means 110, speech recognition means 120, storage means 130 that stores a result of recognition, recognition result evaluation means 140, recognition result formatting means 150, and output means 160. These means generally operate as follows.

The speech input means 110 obtains speech waveform data through a microphone, a telephone line, a computer network, a waveform file, or the like and transfers the obtained speech waveform data to the speech recognition means 120.

The speech recognition means 120 performs speech recognition processing on the speech waveform data supplied from the speech input means 110. As a result, the speech recognition means 120 obtains recognition candidate word strings (hereinafter referred to as a "recognition result"), likelihoods, confidences, and the like. These are sent to the storage means 130.

The storage means 130 holds:
a waveform input to the storage recognition means 120
the recognition result received from the speech recognition means 120
likelihoods, confidences, and importance levels of respective portions of the recognition result, and the like.

Then, the storage means 130 transfers to the recognition result evaluation means 140 and the recognition result formatting means 150 information necessary for the recognition result evaluation means 140 and the recognition result formatting means 150, based on an instruction from each of the recognition result evaluation means 140 and the recognition result formatting means 150.

The recognition result evaluation means 140 evaluates a priority of each portion of the speech recognition result based on the information supplied from the storage means 130 and a task priority list given in advance, and stores a result of the evaluation in the storage means 130.

The priority used in this example will be described. Though no limitation is imposed, PRIORITY (w), which is the priority of a word w is obtained by the following expression (1).

$$\text{PRIORITY}(w) = f(\text{CONFIDENCE}(w), \text{IMPORTANCE}(w)) \quad (1)$$

where,
CONFIDENCE (w) indicates the confidence of a recognition result of the word w,
IMPORTANCE (w) indicates the importance level of the word w, and
f(x, y) indicates an operation of mixing the confidence and the importance level.

The confidence of a word is a measure indicating correctness of the recognition result of the word. By giving priority to a word which is (considered to be) more correct among recognition results, a possibility of being bothered by erroneous recognition can be reduced.

A significant portion in a speech, in particular, can be expected to be spoken comparatively carefully. The confidence of the careful speech is generally increased.

The importance level is given to each word in advance. This importance level is set according to the domain or the purpose of a speech recognition application. When the importance level is used, information can be more efficiently searched out from a speech recognition result by giving priority to a word to which particular attention should be paid at a time of referring to the speech recognition result. In this example, the importance level may be computed by the recognition result evaluation means 140. Alternatively, the importance level corresponding to a word may be stored and held in the storage means 130 and referred to when the priority of the word is computed by the recognition result evaluation means 140. When the importance level is stored in the storage means 130, information on each word and the corresponding importance level may be stored in a removable storage medium or the like as a dictionary according to the application or the domain, and this may be stored in the storage means 130 according to the purpose. Alternatively, information on the importance level may be downloaded through a network and stored in the storage means 130.

In the above expression (1), as the mixing operation f,
(A) linear summation using an appropriate coefficient
(B) multiplication using an appropriate bias or the like is used.

In the operation (A), a word with a higher confidence or a higher importance level is determined to have a higher priority. On which parameter emphasis is placed is adjusted by a mixing ratio.

Though the operation (B) is similar to the operation(A), the operation (B) is employed when an approach to correcting
the importance level by correctness of speech recognition is more obvious.

Combination of the importance level and the confidence based on a plurality of measures may be as a matter of course performed.

In speech recognition, optimal matching is sought for all segments of an input speech. Among words resulting from the speech recognition, there is a word which is insignificant or will be an impediment in view of the domain or the purpose of the speech recognition application.

By filtering the word as described above, a more suitable priority of a recognition result can be obtained. Generally, in many cases, applying low bias to priorities of words (such as "well" and a response to make a conversation go smoothly) which are called unneeded words or insignificant words, for example, is more preferable.

Further, depending on the use, it is more preferable to raise the priority when a word is categorized as a nominal (such as a noun, a pronoun, an s-consonant irregular conjugation verb stem, or the like). This is because a word with a highest amount of information frequently belongs to the nominal.

There are various specific definitions about the confidence. In this example, however, the posterior probability of a word or the posterior probability on an arc of the word in a word graph obtained as a recognition result is employed.

Speech recognition is processing that determines a chain of words that best match an input voice. A certain word has a possibility to be connected to a plurality of words. Further, each word may be connected to a plurality of other words. A directed graph structure constructed by a chain of words in a manner as described above is referred to as a "word graph".

Generally, the word graph is represented by a directed acyclic graph, and is formed of nodes and arcs (directed links each connecting the respective nodes). A word is attached to each arc. Times are attached to start and end points of the arc, respectively.

Using the above information, a word attached to each arc and input speech feature sequences at the relevant times are determined. A distance between the input voice feature sequences (which is an acoustic likelihood) can be obtained.

Further, a chain of arcs means a chain of words. Accordingly, an occurrence probability of the word chain (which is a linguistic likelihood) in a given language model can be obtained.

The posterior probability of a certain arc A indicates a ratio of a sum of occurrence probabilities of all paths that pass through the arc A to a sum of occurrence probabilities of all paths in a word graph.

Now, it is assumed that a closed word graph G is given, and that all arc chain paths (paths) that start from the starting node of the word graph G to the terminating node of the word graph G can be traced.

In this case, occurrence probabilities (forward probabilities) of all paths that start from the starting node to the arc A can be obtained.

Likewise, occurrence probabilities (backward probabilities) of all paths that start from the arc A to the terminating node can also be computed.

By obtaining a sum of products of the forward occurrence probabilities and the backward probabilities of all combinations of the paths that reach the arc A and start from the arc A, and dividing the sum of products of the forward and backward probabilities by a sum of occurrence probabilities of all the paths obtained likewise, the posterior probability of the arc A is obtained (refer to Non-patent Document 2).

As other confidence, one of various measures as follows is used:

calculating a ratio of the likelihood of a recognition result candidate that ranks first to likelihoods of top N recognition result candidates (refer to Non-patent Document 3, for example)

calculating a ratio at which a certain word appears at a same position in a plurality of language models (refer to Non-patent Document 3, for example)

adopting a density of the number of hypotheses for an input speech at a certain time (refer to Non-patent Document 5).

A common respect of all the measures is that the measures indicate how high the likelihood of a portion of a recognition result (such as a word, a word string, or a phoneme string in some cases) or the whole recognition result is to other conflicting recognition candidate.

Next, assignment of the importance level in this example will be described. In this example, the assignment of the importance level may be performed manually or automatically.

The manual assignment is suited to a case where the number of types of words to which particularly high importance level are desired to be assigned is small. In this case, to words of which no particular importance levels are not clearly specified, the same importance level (such as one or zero) is assigned.

Then, an importance word is selected out, by referring to a priori knowledge about the domain and the purpose of the speech recognition application, and a high importance level is explicitly assigned to the selected word.

When the importance level is assigned automatically, a priori knowledge about a statistical approach and an input speech structure is used. As the simplest method, a high importance level is assigned to a word that frequently appears, and a low importance level is assigned to a word that does not frequently appear.

In the TF/IDF (term frequency/inverse document frequency) method, a high importance level is assigned to a characteristic word in each of some texts (sets of sentences) and a low importance level is assigned to a word other than the characteristic word. When an occurrence frequency of a term $t_j$ in a document $D_i$ is indicated by a term frequency $t_{ij}$, the number of documents in which the term $t_j$ appears is indicated by a document frequency $df_j$, and the total number of documents is indicated by N, an inverse document frequency (inverse document frequency) $idf_j$ is given by normalization of the document frequency $df_j$ using the total number of document, and is given by $idf_j=\log(N/df_j)$, for example. A weight of the term $t_j$ of the document $D_i$ in the TF/IDF method is then given by $w_{ij}=t_{ij}\times idf_j$.

When a speech to be handled is comparatively conventional, it is often the case that a word with a high TF/IDF value is important. A conversation between a shop clerk and a customer in a fast food shop, for example, is comparatively conventional. It may be expected that when a dialogue with an individual customer is edited as a text, a characteristic word in each text becomes a word such as the name of a merchandize, which differs for each customer.

Further, it may be suitable to set the importance level of a nominal or a declinable word that appears before and after of a word with a high importance level to be slightly higher than that of the nominal or the declinable word when the nominal or the declinable word appears before and after a word with a low importance level.

The recognition result formatting means 150 performs formatting of a recognition result output from the speech recognition means 120 according to a range output to the output means 160 or the like. The recognition result formatting means performs formatting so that a portion evaluated to be more important by the recognition result evaluation means 140 is displayed by priority.

The recognition result formatting means 150 sends the formatted recognition result to the output means 160.

The output means 160 is formed of a display device, a file device, a printing device, and the like, and outputs the result formatted by the recognition result formatting means 150.

Figure 2:
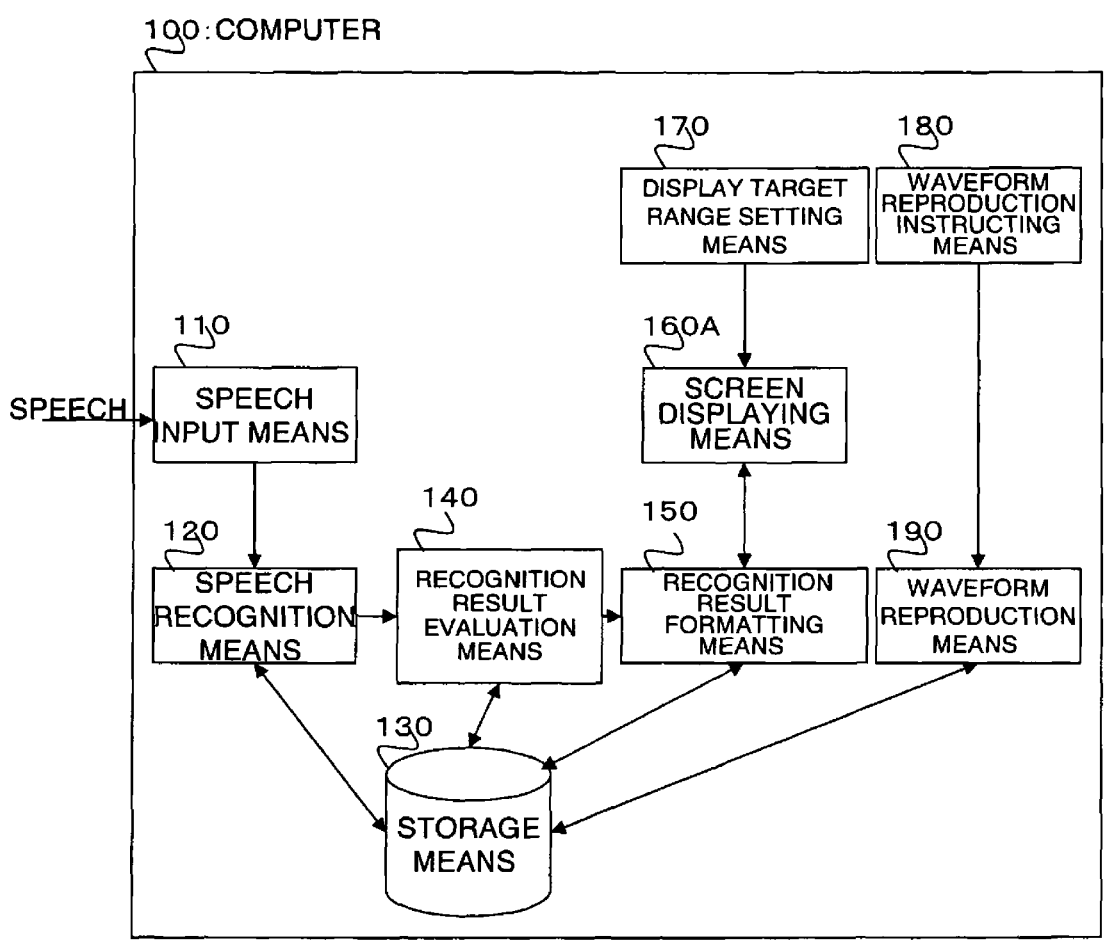
FIG. 2 is a block diagram showing a configuration of a second embodiment of the present invention.

FIG. 2 is a diagram showing a configuration of a second example of the present invention. The second example includes screen displaying means 160A as the output means 160 in the configuration in FIG. 1. The second example includes display target range setting means 170, waveform reproduction instructing means (speech reproduction instructing means) 180, and waveform reproduction means (speech reproduction means) 190.

The display target range setting means 170 changes a range to be displayed onto the screen displaying means 160A based on an operation instructed by a user, and transfers the changed range to the recognition result formatting means 150.

The recognition result formatting means 150 performs formatting processing whenever the display target range is switched by the display target range setting means 170.

The waveform reproduction instructing means 180 instructs the waveform reproduction means 190 to reproduce an original speech for a recognition result, by selection of the recognition result displayed on the screen displaying means 160A by the user.

The waveform reproduction means 190 extracts relevant speech waveform data from the storage means 130 based on the instruction from the waveform reproduction instructing means 180, and outputs the speech waveform data to a loudspeaker, a telephone line, a computer network, a waveform file, or the like.

Figure 3:
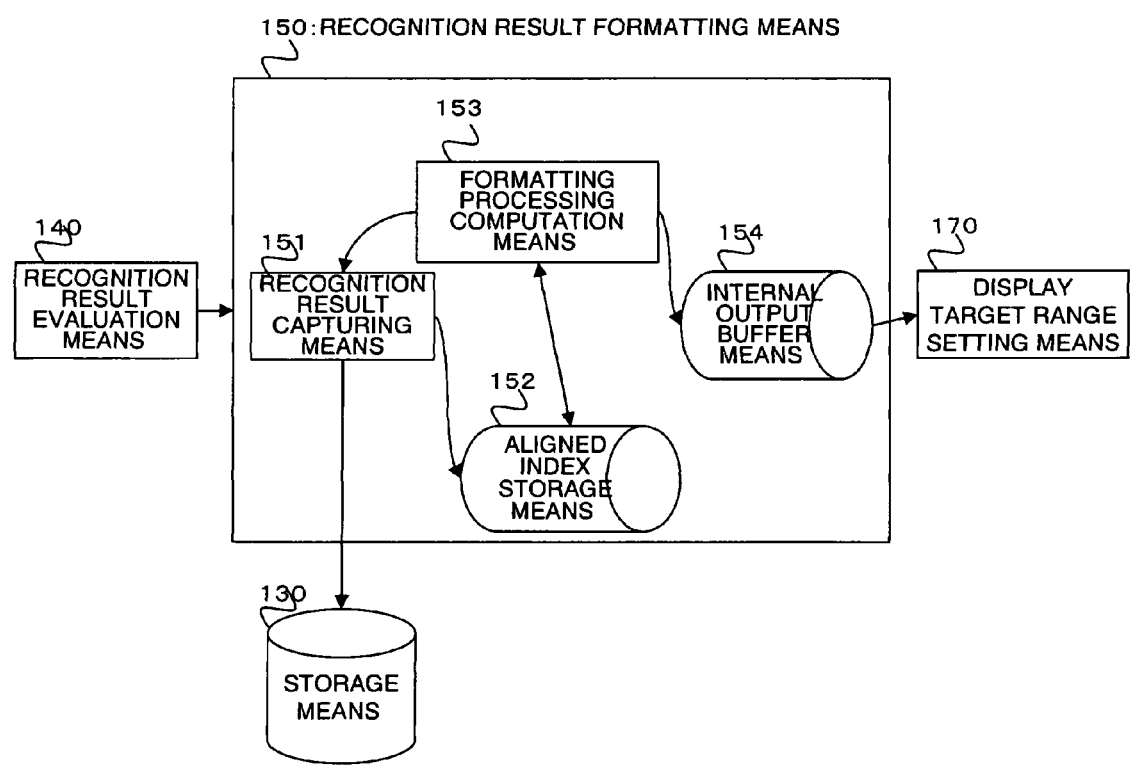
FIG. 3 is a block diagram showing a configuration of recognition result formatting means in the second embodiment of the present invention.

FIG. 3 is a diagram showing a configuration of the recognition result formatting means 150 in this example shown in FIG. 2. Referring to FIG. 3, the recognition result formatting means 150 includes recognition result capturing means 151, aligned index storage means 152, formatting processing computation means 153, and internal output buffer means 154.

Next, an overall operation of this example will be described in detail with reference to FIGS. 2 and 3 and further a state transition diagram of FIG. 4.

When speech waveform data is received from the speech input means 110 in an initial state (a state A1 in FIG. 4), transition to a speech recognition processing state (a state A2 in FIG. 4) is made.

The speech recognition means 120 stores the received speech waveform data in the storage means 130, also performs speech recognition processing on the received speech waveform data, and also stores a result of the speech recognition processing in the storage means 130.

Figure 4:
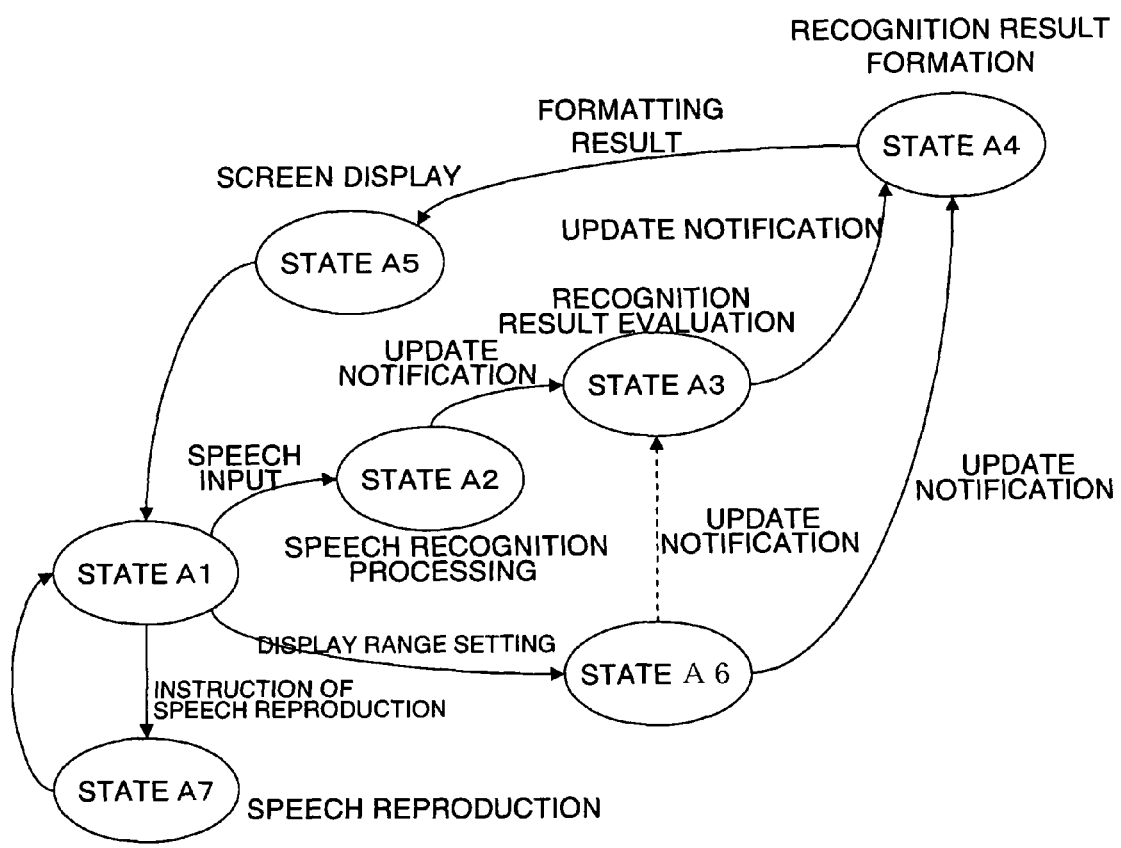
FIG. 4 is a state transition diagram in the second embodiment of the present invention.

The speech recognition means 120 notifies updating of the recognition result to the recognition result evaluation means 140 (a transition from the state A2 to A3 in FIG. 4). The recognition result evaluation means 140 adds the priority to the recognition result, and stores the recognition result with the priority added thereto in the storage means 130 and also notifies updating of the recognition result to the recognition result formatting means 150 (a transition from the state A3 to A4 in FIG. 4).

The recognition result formatting means 150 performs predetermined formatting processing on the recognition result extracted from the storage means 130 by referring to the priority, in accordance with a display target range given by the display target range setting means 170. Then, the recognition result formatting means 150 transfers a result of the formatting processing to the screen displaying means 160A (a transition from the state A4 to A5 in FIG. 4). The screen displaying means 160A presents the received result to the user, and a return to the initial state A1 in FIG. 4 is made.

On the other hand, when the user performs switching of the display target range (a transition from the state A1 to A6 in FIG. 4) using the display target range setting means 170 in the initial state A1 in FIG. 4, the recognition result formatting means 150 performs formatting processing (the state A4 in FIG. 4) again upon receipt of the result of switching. The screen displaying means 160A presents the received result to the user again, and a return to the initial state A1 in FIG. 4 is made. Implementation by which an operation of the recognition result evaluation means itself may be changed by the display target range is also possible. In that case, transition from the state A6 to the state A3 in FIG. 4 is made, responsive to switching of the display target range.

On the other hand, when the user selects one of recognition results displayed on the screen displaying means 160A using the waveform reproduction instructing means 180 (a transition from the state A1 to A7 in FIG. 4), the waveform reproduction instructing means 180 notifies this selection to the waveform reproduction means 190.

Based on this notification, the waveform reproduction means 190 extracts from the storage means 130 speech waveform data that is the recognition source of the recognition result, and reproduces the speech waveform data (a transition from the state A7 to A1 in FIG. 4).

Figure 5:
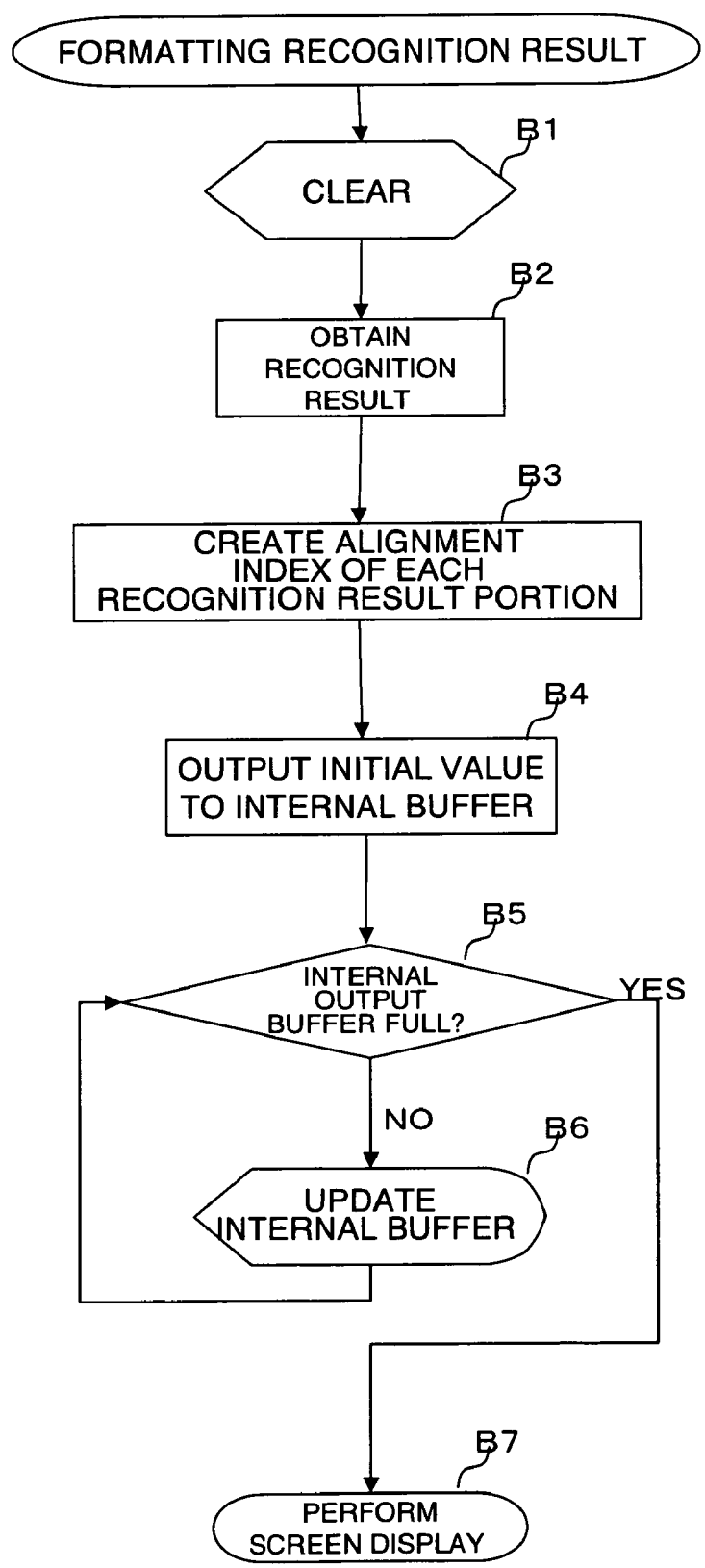
FIG. 5 is a flowchart showing an operation of the second embodiment of the present invention.

FIG. 5 is a flowchart illustrating an operation of the recognition result formatting means 150 in the exemplary example of the present invention. The operation of the recognition result formatting means 150 will be described in detail with reference to FIGS. 2, 3, and 5.

Based on a notification from the speech recognition means 120 or the display target range setting means 170, the recognition result formatting means 150 clears the internal output buffer means 154 and the aligned index storage means 152 (in step B1 in FIG. 5).

Next, using the recognition result capturing means 151, the recognition result formatting means 150 obtains all recognition results included in a current display target range and priorities of the recognition results from the storage means 130 (in step B2 in FIG. 5).

The recognition result formatting means aligns respective portions of the recognition results using the priorities of the recognition results as alignment keys, and stores indices of the results of alignment in the aligned index storage means 152 (in step B3 in FIG. 5).

Further, the formatting processing computation means 153 performs formatting processing for displaying the all recognition results by "–", and outputs results of the formatting processing to the internal output buffer means 154 (in step B4 in FIG. 5).

The formatting processing computation means 153 checks the internal output buffer means 154. When a space capable of being displayed is left (branching to NO in step B5 in FIG. 5), the formatting processing computation means 153 extracts an index with a highest priority from the aligned index storage means 152. At the same time, the formatting processing computation means 153 deletes the index from the aligned index storage means 152. The recognition result formatting means 150 performs formatting processing again so that a portion of a recognition result corresponding to the obtained index is displayed as a character string rather than "–", and outputs the result of the formatting processing to the internal output buffer means 154 (in step B6 in FIG. 5).

The recognition result formatting means 150 repeats processing in step B6 in FIG. 5 until the internal output buffer means 154 becomes full (branching to YES in step B5 in FIG. 5). Finally, the recognition result formatting means 150 delivers output results stored in the internal output buffer means 154 to the screen displaying means 160A (in step B7 in FIG. 5).

In this example, the computation is performed so that a recognition result with a certain priority or higher is always output, for example, assuming that the internal output buffer means 154 is larger than the screen displaying means 160A.

In this case, all the display target range may not be able to be displayed on the screen at a time. Each recognition result portion determined to have a lower priority may be tenaciously displayed in the form of a character string rather than "–", with a manner of display changed according to the priority. For example, the font of a recognition result portion with a very small priority is displayed to be small. The display size of the font is gradually increased with an increase in the priority. Then, a most important portion is displayed using the font of a sufficiently appreciable size.

Since a portion with a low priority needs a display space which is the same as that of "–", a purpose of saving the display space is served.

A word with a low priority may be displayed with a light colored font, and the displayed color of the font may be gradually darkened with an increase in the priority. In this case, a portion with a low priority also needs a display space which is almost the same as that of a portion with a high priority. Thus, this display method is inferior in terms of saving the display space. However, when overlooking the display, the user can intuitively see a distance between respective portions.

As a result, there is an advantage that the user can identify at a glance the following information such as:
 whether a certain word and other word is continuous, or separate to each other, temporally, or
 how far the certain word and the other word separate to each other.

Figure 6A:
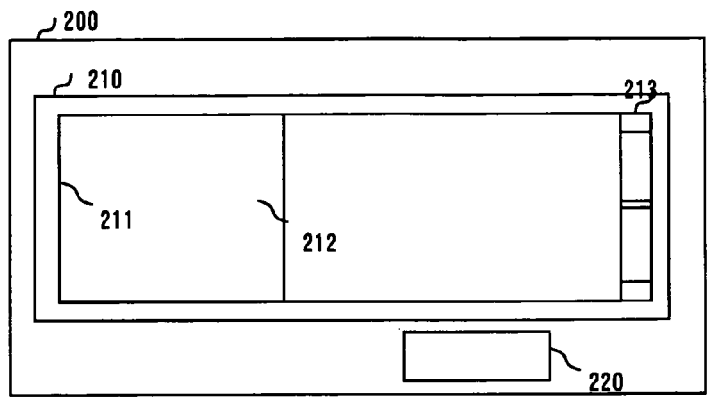
FIGS. 6A, 6B, and 6C are diagrams showing display examples in the embodiment of the present invention, respectively.
Figure 6B:
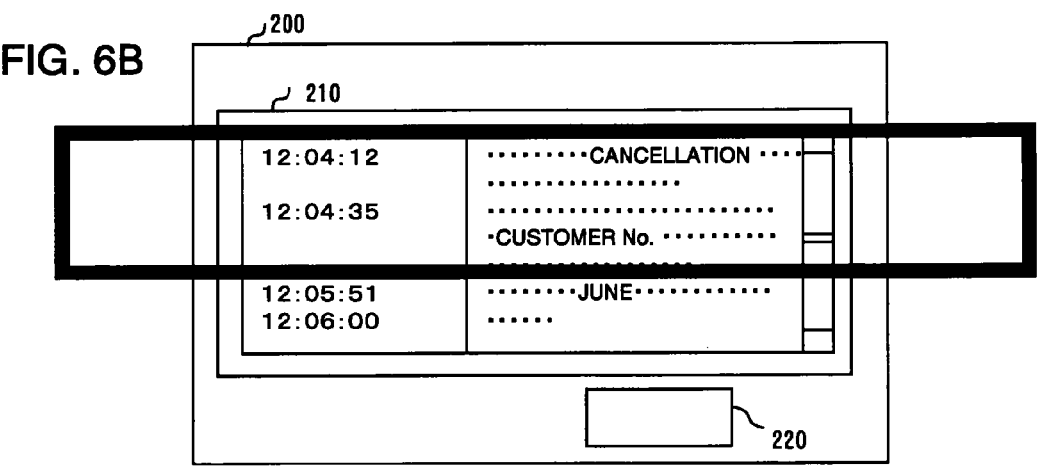
Figure 6C:
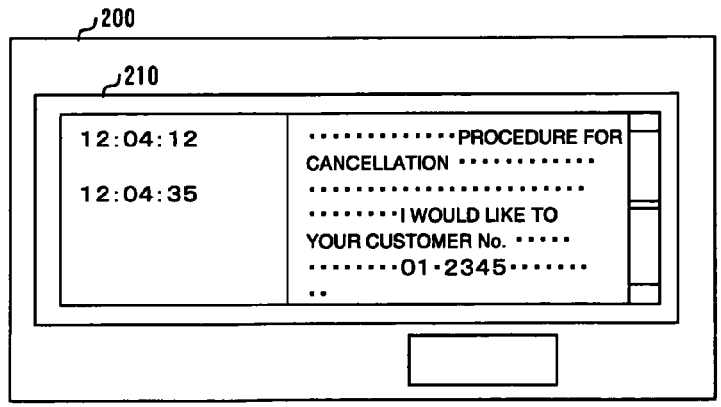

FIGS. 6A, 6B, and 6C are diagrams, each of which shows an example of screen display in the example of the present invention. Referring to FIGS. 6A, 6B, and 6C, a UI image in this example will be described.

Referring to FIG. 6A, a recognition result display list box 210 and an enlargement display button 220 are arranged on a window 200.

The recognition result display list box 210 further includes a speech index pane 211, a recognition result pane 212, and a scroll bar 213.

Display content of the recognition result display list box 210 is vertically scrolled by the scroll bar 213.

Referring to FIG. 6B, in an initial state, each speech and a recognition result corresponding to each speech are arranged in the recognition result display list box 210.

In order to display a lot of recognition results at a time, most recognition results, except important information, are displayed in the form of "–". The enlargement display button 220 is set to be disabled.

When the user selects a certain range of the recognition result display list box 210 using a mouse, the enlargement display button 220 becomes effective. When the user clicks the enlargement display button 220, the display target range is switched to the selected range, and content to be displayed in the recognition result display list box 210 is switched.

Referring to FIG. 6C, it can be seen that since the number of targets to be displayed at a time has been reduced, more information on an individual recognition result has been output.

Next, an effect of this example will be described.

In this example, the recognition result formatting means 150 performs formatting processing suited to a given display target range by the display target range setting means 170. Thus, recognition results for speech data in a certain range can be displayed on the screen in a form easy to be overlooked.

Further, in this example, when the user switches the display target range using the display target range setting means 170, the recognition result formatting means 150 performs formatting processing again in accordance with this switching. Accordingly, a recognition result to be displayed can always include an information amount appropriate for the display target range.

Further, in this example, the recognition result formatting means 150 operates by referring to priorities given by the recognition result evaluation means 140. Thus, the user can quickly find a recognition result with a higher priority.

In this example, reproduction of an original speech from a recognition result can be quickly instructed. For this reason, when an overall display is overlooked and an interesting recognition result is then found, the recognition result can be immediately reproduced, and the full text of the recognition result can also be checked.

According to this example, in a specified mode where a large quantity of speech data is browsed (such as the one for speech archive retrieval processing), such a UI is especially suitable. The reproduction function has an effect of compensating for information that has not been displayed due to the formatting processing and an effect of compensating for a recognition accuracy of speech recognition processing.

Next, a third example of the present invention will be described. A configuration of this example is the same as that in FIG. 2. This example is different from the example in FIG. 2 described above in an operation of the recognition result formatting means 150 in FIG. 2. The operation of the recognition result formatting means 150 in this example will be described in detail with reference to the flowchart in FIG. 5.

Based on a notification from the speech recognition means 120 or the display target range setting means 170, the recognition result formatting means 150 clears the internal output buffer means 154 and the aligned index storage means 152 (in step B1 in FIG. 5).

Next, using the recognition result capturing means 151, the recognition result formatting means 150 obtains from the storage means 130 all speech waveform data, recognition results, and priorities of the recognition results included in a current display target range (in step B2 in FIG. 5).

The recognition result formatting means 150 aligns respective portions of the recognition results using the priorities of the recognition results as the alignment keys, and stores indices of the results of alignment in the aligned index storage means 152 (in step B3 in FIG. 5).

Further, the formatting processing computation means 153 temporally arranges the obtained speech waveform data, and outputs resulting data to the internal output buffer means 154 (in step B4 in FIG. 5).

The formatting processing computation means 153 checks the internal output buffer means 154. When a space capable of being displayed is left (branching to NO in step B5 in FIG. 5), the formatting processing computation means 153 extracts an index with a highest priority from the aligned index storage means 152. At the same time, the formatting processing computation means 153 deletes the index from the aligned index storage means 152.

The formatting processing computation means 153 performs formatting processing again so that a portion of the recognition result corresponding to the obtained index is displayed close to speech waveform data corresponding to the portion in the form of a balloon, and outputs the result of the formatting processing to the internal output buffer means 154 (in step B6 in FIG. 5).

The size of the balloon and a character font to be displayed may be enlarged according to the priority.

Further, by displaying the balloon using see-through display and by performing superimposed balloon display, a portion adjacent to the recognition result may be displayed. In this case, by increasing transmittance of the balloon with a low priority, only a word with a high priority is seen to be raised.

Further, the balloon may be combined with animation (blinking), and more gaudy animation than for other portion may be used for a portion with a high priority.

The above operation is repeated until the internal output buffer means 154 becomes full. Finally, output results stored in the internal output buffer means 154 are passed to the screen displaying means 160A (in step B7). Computation is performed so that a recognition result with a certain priority or higher is always output, assuming that the internal output buffer means 154 is larger than the screen displaying means 160A. As a result, all the display target range may not be able to be displayed on the screen at a time.

A speech recognition system of the present invention can be applied to operator quality control in a call center, viewing of minutes, video archive retrieval, speech transcription, and the like, for example.

A computer program of the present invention can be applied to an operator quality control program and an answering trouble detection program in a call center, a minutes viewing program for conferences and congresses, a speech or video archive retrieval program, and a computer program that supports speech transcription processing. These programs may be executed by a server device or the like, thereby implementing speech recognition processing of the present invention.

The speech transcription processing is an operation of reproducing a speech using a recording medium that has recorded the speech and transcribing content of the reproduced speech into sentences while the reproduced speech is being listened to. The computer program of the present invention supports the speech transcription processing by performing respective processing of the speech input means 110, speech recognition means 120, recognition result evaluation means 140, recognition result formatting means 150, output means 160 (or the screen displaying means 160A, display target range setting means 170, waveform reproduction instructing means 180, and waveform reproduction means 190) described in the above examples. By executing this speech transcription processing program, the following operations and effects can be achieved:

A context that will appear following a speech can be foreseen while the speech is being listened to.

Skip-reading (skip-listening) and rewinding can be visually specified using a display screen.

Man-hour for key type input can be saved with respect to an utterance, of which recognition accuracy is comparatively good.

Next, a description will be given about an example where the speech recognition system of the present invention has been applied to a device of reproducing a recorded speech, with reference to FIG. 1. The speech input means 110 in FIG. 1 receives and reproduces speech data recorded on a recording medium (such as an analog tape or a digital recording medium) and supplies the reproduced data on a speech (represented by a digital speech signal) to the speech recognition means 120. The speech recognition means 120 recognizes the input speech. The recognition result evaluation means 140 computes priorities. The recognition result formatting means 150 outputs a recognition result of a predetermined priority from the output means 160, based on priority information or the like. By selectively outputting a nominal or the like using the above-mentioned filtering, for example, a content summary of archive data with recording content (theme) thereof being unknown can be grasped without listening to all the recorded content. Further, development of the theme of the recorded content can be presented at a glance, using a content structure of the archive data (structure indicating recognized words, occurrence frequencies of the recognized words, a time series, and the like). Further, by recording a recognition result and a priority thereof in a position corresponding to the position of original waveform data, a temporal transition of a conference that continues for a long hour, for example, can be overlooked as a summary, at a time of reproduction. When the configuration in FIG. 2 is used, an overview of recorded content is displayed. Assume that details of the recorded content are desired to know. The, by selecting a range of the recorded content desired to know, reproduction of an original speech can be obtained, or detailed speech recognition result information can be obtained in the form of a text on the screen.

The speech recognition system of the present invention or the reproduction device to which the present invention has been applied may be applied to a portable information communication terminal such as a cellular phone (mobile phone), a PDA, and the like. By requesting a speech recognition server to perform speech recognition processing on a speech input to a terminal (a client) through an IP network or the like, and receiving a recognition result (including recognition information such as speech likelihood and linguistic likelihood) at the terminal, a load of an arithmetic operation amount imposed on the terminal may be reduced.

Further, as a variation of the example shown in FIG. 1, a configuration may be used in which content (such as speech data, a speech recognition result, and priority information) stored in the storage means 130 is stored in a recording medium not shown and is then output, using the recognition result formatting means 150 and the output means 160. In this case, the configuration in FIG. 1 is comprised of the storage means 130, recognition result formatting means 150, and output means 160 alone. A recognition result (of portions that form the recognition result) and the priority of the recognition result are stored in the storage means 130, being associated with each another. Thus, a summary of the entire recorded content can be quickly checked at high speed at a time of outputting a reproduced output by the recognition result formatting means 150 and the output means 160.

Though the above description was given about the present invention in connection with the examples described above, the present invention is not limited to the configurations of the examples described above. The present invention of course includes various variations and modifications that could be made by those skilled in the art within the scope of the present invention.

The invention claimed is:

1. A speech recognition system comprising:
   speech input means that inputs speech data;
   speech recognition means that receives the speech data input from said speech input means and performs speech recognition;
   recognition result evaluation means that derives a confidence of each portion of a recognition result obtained by the speech recognition by said speech recognition means and determines a priority of the recognition result based on the confidence which is obtained by comparison between portions of the recognition result, wherein said recognition result evaluation means determines the priority of the recognition result and/or a portion that forms the recognition result, obtained by the speech recognition by said speech recognition means;
   storage means that stores at least recognition result and the priority;
   display target range setting means that sets a range of the speech data to he output and a range of at least one of the recognition result and the portion of the recognition result;
   recognition result formatting means that performs formatting of output information on the recognition result according to the priority, wherein said recognition result formatting means determines display/non-display of the recognition result and/or the portion that forms the recognition result and outputs an output image, according to the priority, and wherein said recognition result formatting means performs determining display/non-display of the recognition result and/or the portion of the recognition result and creating the output image according to said priority and set range of said output; and
   output means that outputs the output information that has undergone formatting by said recognition result formatting means, wherein said output means includes screen displaying means for outputting the output image to a display device.

2. The speech recognition system according to claim 1, wherein the input speech data supplied to said speech recognition means from said speech input means is stored in said storage means; and
   the speech recognition system further include:
   speech reproduction instructing means that refers to the output image and specifying reproduction of the input speech data; and
   speech reproduction means that reproduces the input speech data stored in said storage means, based on the specification by said speech reproduction instructing means.

3. The speech recognition system according to claim 1, wherein said recognition result evaluation means derives the priority using at least one of an acoustic likelihood, a linguistic likelihood, and a confidence based on a posterior probability of at least one of the recognition result and the portion of the recognition result obtained by said speech recognition means.

4. The speech recognition system according to claim 1, wherein said recognition result evaluation means derives the priority of a word or a chain of words that may form the recognition result and/or the portion of the recognition result obtained by said speech recognition means, using an importance level.

5. The speech recognition system according to claim 1, wherein, when the output image is created, said recognition result formatting means displays at least one of the recognition result and the portion of the recognition result with the priority thereof exceeding a predetermined threshold value.

6. A server device including the speech recognition system according to claim 1.

7. A portable communication terminal device including the speech recognition system according to claim 1.

8. A speech recognition system comprising:
speech input means that inputs speech data;
speech recognition means that receives the speech data input from said speech input means and performs speech recognition;
recognition result evaluation means that derives a confidence of each portion of a recognition result obtained by the speech recognition by said speech recognition means and determines a priority of the recognition result based on the confidence which is obtained by comparison between portions of the recognition result, wherein said recognition result evaluation means determines the priority of the recognition result and/or a portion that forms the recognition result, obtained by the speech recognition by said speech recognition means;
storage means that stores at least the recognition result and the priority;
recognition result formatting means that performs formatting of output information on the recognition result according to the priority, wherein said recognition result formatting means determines display/non-display of the recognition result and/or the portion that forms the recognition result and outputs an output image, according to the priority, and wherein, when the output image is created, said recognition result formatting means performs sequential display of the recognition result and/or the portion of the recognition result in descending order of the priority, and when there is not an enough display region of said display device, said recognition result formatting means performs alternative display of a remainder of the recognition result and/or the portion of the recognition result, using a predetermined symbol; and
output means that outputs the output information that has undergone formatting by said recognition result formatting means, wherein said output means includes screen displaying means for outputting the output image to a display device.

9. A speech recognition system comprising:
speech input means that inputs speech data;
speech recognition means that receives the speech data input from said speech input means and performs speech recognition;
recognition result evaluation means that derives a confidence of each portion of a recognition result obtained by the speech recognition by said speech recognition means and determines a priority of the recognition result based on the confidence which is obtained by comparison between portions of the recognition result, wherein said recognition result evaluation means determines the priority of the recognition result and/or a portion that forms the recognition result, obtained by the speech recognition by said speech recognition means;
storage means that stores at least the recognition result and the priority;
recognition result formatting means that performs formatting of output information on the recognition result according to the priority, wherein said recognition result formatting means determines display/non-display of the recognition result and/or the portion that forms the recognition result and outputs an output image, according to the priority, and wherein, when the output image is created, said recognition result formatting means performs control so that an area of the display region occupied by the recognition result and/or the portion of the recognition result increases in ascending order of the priority, and a larger area of the display region is occupied by the recognition result and/or the portion of the recognition result with the priority of a relatively high level, and a smaller area of the display region is occupied by the recognition result and/or the portion of the recognition result with the priority of a relatively low level; and
output means that outputs the output information that has undergone formatting by said recognition result formatting means, wherein said output means includes screen display in means for outputting the output image to a display device.

10. A method of performing speech recognition by a speech recognition device said method comprising:
inputting speech data;
performing speech recognition processing on the input speech data;
deriving a confidence of at least one of a recognition result and a portion of the recognition result obtained by the speech recognition processing and determining a priority of the at least one of the recognition result and the portion of the recognition result based on the confidence which is obtained by comparison between portions of the recognition result;
performing formatting of output information on the recognition result and/or the portion of the recognition result according to the priority;
outputting the formatted output information;
determining display/non-display of the recognition result and/or the portion of the recognition result and creating an output image according to the priority;
setting a range of the speech data to be output and a range of the at least one of the recognition result and the portion of the recognition result;
in creating the output image, the display/non-display of the recognition result and/or the portion of the recognition result being determined and the output image being created according to priority and set range of said output; and
outputting the created output image onto a display screen.

11. The speech recognition method according to claim 10, further comprising:
referring to the output image and reproducing the input speech data; and
reproducing the speech data based on the specification.

12. A non-transitory computer readable medium encoded with a program that causes a computer which performs speech recognition processing to execute:
a processing of inputting speech data;
a processing of performing speech recognition on the input speech data;
a processing of deriving a confidence of at least one of a recognition result and a portion of the recognition result obtained by the speech recognition and determining a priority of the at least one of the recognition result and the portion of the recognition result based on the confidence which is obtained by comparison between portions of the recognition result;

a processing of performing formatting of output information on the recognition result and/or the portion of the recognition result according to the priority a processing of setting a range of the speech data to be output and a range of the at least one of the recognition result and the portion of the recognition result;

a processing of determining display/non-display of the recognition result and/or the portion forming the recognition result and creating an output image according to said priority and set range of said output; and a processing of outputting the formatted output information, from an output device.

* * * * *